United States Patent [19]

Fujita et al.

[11] Patent Number: 5,487,021
[45] Date of Patent: Jan. 23, 1996

[54] COMPUTER-AIDED DESIGN SYSTEM

[75] Inventors: Shigehisa Fujita; Kenji Sato, both of Saitama, Japan

[73] Assignee: Honda Giken Kogyo Kabushiki Kaisha, Tokyo, Japan

[21] Appl. No.: 84,073

[22] Filed: Jun. 30, 1993

[30] Foreign Application Priority Data

Jun. 30, 1992 [JP] Japan .................. 4-173522

[51] Int. Cl.⁶ .................................................. G06F 17/00
[52] U.S. Cl. .................................................. 364/578
[58] Field of Search ........................ 364/578, 571, 364/490, 488, 489, 476, 474.24, 560; 395/123, 141, 134

[56] References Cited

U.S. PATENT DOCUMENTS

| | | | |
|---|---|---|---|
| 4,829,446 | 5/1989 | Draney | 364/488 |
| 4,864,520 | 9/1989 | Setoguchi et al. | 364/560 |
| 5,065,344 | 11/1991 | Kishimo et al. | 395/134 |
| 5,184,306 | 2/1993 | Erdman et al. | 364/474.24 |
| 5,184,307 | 2/1993 | Hull et al. | 364/476 |
| 5,185,855 | 2/1993 | Kato et al. | 364/474.24 |
| 5,197,013 | 3/1993 | Dundorf | 364/474.24 |
| 5,214,752 | 5/1993 | Meshkat et al. | 395/123 |
| 5,268,999 | 12/1993 | Yokoyama | 395/141 |

*Primary Examiner*—Ellis B. Ramirez

[57] ABSTRACT

The CAD system of the present invention allows an operator to easily recognize actual clearance values between displayed parts and provides clearance value optimization through simple operator intervention. The CAD system includes a main memory, a CRT display unit, a keyboard and a CPU. The main memory contains CAD data of a plurality of parts. The CRT display unit displays image data corresponding to the CAD data. The keyboard allows the operator to plot or draw figures and to input values. In response to the operations on the keyboard, the CPU reads CAD data of desired parts from the main memory and combines the image data corresponding to the retrieved CAD data for display on the CRT display unit. The CPU calculates the clearance of the image data of the displayed parts and displays the clearance using contour lines set apart as calculated. The CPU also corrects the clearance between the displayed parts in accordance with operator instruction.

11 Claims, 11 Drawing Sheets

Fig. 4
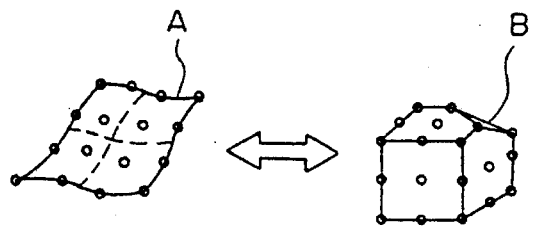
Fig. 5
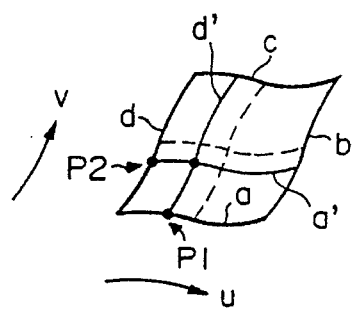
Fig. 6 (a)    Fig. 6 (c)    Fig. 6 (d)
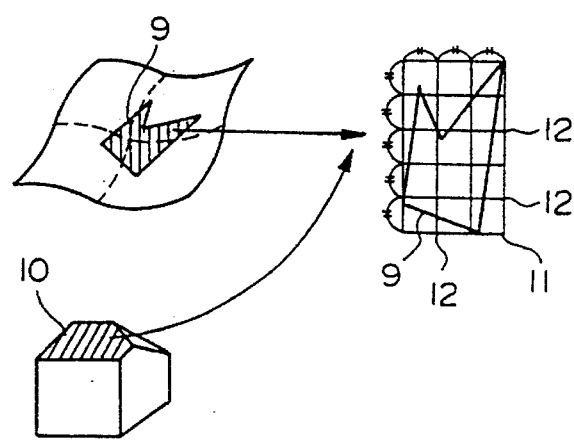
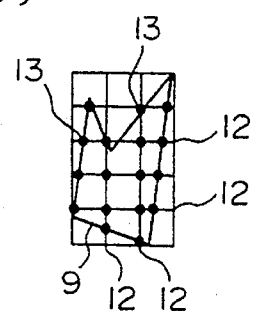
Fig. 6 (b)

COMPUTER-AIDED DESIGN SYSTEM

BACKGROUND OF THE INVENTION

1. Field of the Invention

The present invention relates to a computer-aided design system for use in plotting and drawing of figures and in other related editing work.

2. Description of the Background Art

Various systems known as computer-aided design (CAD) systems have been developed to support the plotting, drawing and editing of figures. These systems permit easy drawing and plotting of diverse figures and are capable of storing the results of such figure manipulation into a memory as CAD data. The stored CAD data may later be read out of memory for correction and other editing purposes.

In a CAD system setup, it may happen that CAD data on a plurality of separately plotted parts (e.g., engine, cover and frame of a motorcycle) are read from the memory and combined into CAD data constituting a single integral device (e.g., entire motorcycle) for display onto a CRT display unit. In that case, the CAD system must permit the operator to recognize clearances between the parts. The CAD data should then be corrected as needed. Otherwise the clearances between the parts may not be sufficient or one part may penetrate the other (a phenomenon called interference), thereby making the manufacture of the target device impossible. The avoid such interference, a conventional CAD system requires that the operator cut a number of cross sections out of the combined CAD data to check the value of clearance (hereinafter called the clearance value) for each cross section.

If the check on the cross sections for clearance values proves that any clearance value is insufficient or that some parts interfere with each other, it is necessary for the operator to manually correct relevant CAD data until all clearance values attain sufficient proportions. One disadvantage of the conventional CAD system is that the number of times a cross section is cut out is high and the process involved is inefficient. Another disadvantage is the inability of the system to check for the clearance value of any part of which a cross section is yet to be cut out. A further disadvantage is that an actual clearance value may not be calculated depending on the direction in which the cross section is cut out from the CAD data.

Furthermore, the process in which the conventional CAD system calls on the operator to manually correct relevant CAD data until sufficient clearance values are attained is tedious, time-consuming and inefficient. Inadvertent operations by the operator may bring the preparation of the CAD data to a premature end without sufficient clearance values being attained. In such a case, the insufficient clearance values are recognized only after manufacture of a prototype has begun.

SUMMARY OF THE INVENTION

It is therefore an object of the present invention to provide a computer-aided design system allowing the operator to recognize actual clearance values between component parts easily and to optimize the clearance values by simple operations.

In carrying out the invention and according to a first embodiment thereof, there is provided a computer-aided design system which includes a storage element for storing computer-aided design data of a plurality of parts; a display for displaying image data corresponding to the computer-aided design data; an operating unit for performing plotting, drawing and related tasks and for inputting values; and a controller for reading from the storage element the computer-aided design data of the plurality of parts, for combining the image data corresponding to the computer-aided design data for display on the display, and for calculating clearances between the image data of the plurality of parts displayed on the display so as to further display the clearances in terms of contour lines set apart as calculated.

According to a second embodiment of the invention, there is provided a computer-aided design system which includes a storage element for storing computer-aided design data of a plurality of parts; a display for displaying image data corresponding to the computer-aided design data; an operating unit for performing plotting, drawing and related tasks and for inputting values; and a controller for reading from the storage element the computer-aided design data of the plurality of parts, for combining the image data corresponding to the computer-aided design data for display on the display, and for correcting clearances between the image data of the plurality of parts displayed on the display so as to further display the plurality of parts set apart as corrected.

According to the first embodiment of the invention, the controller first reads from the storage element the CAD data of the plurality of parts in accordance with manipulation of the operating unit by a system user. Image data corresponding to the read-out CAD data are thereafter displayed on the display. Next, the controller calculates the clearances between the image data about the plurality of parts displayed on the display so as to further display the clearances in terms of contour lines separated as calculated.

According to the second embodiment of the invention, the controller first reads from the storage element the CAD data of the plurality of parts in accordance with manipulation of the operating unit by a system user. Image data corresponding to the read-out CAD data are thereafter displayed on the display. Next, the controller calculates the clearances between the image data about the plurality of parts displayed on the display so as to further display the plurality of parts set apart as corrected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 4 is a view illustrating how the contour line calculations of step SA6 in FIG. 3 are performed;

FIG. 5 is another view depicting how the contour line calculations of SA6 in FIG. 3 are executed;

FIGS. 6(a)–6(d) are a set of views showing how the contour line calculations of step SA6 in FIG. 3 are carried out;

DESCRIPTION OF THE PREFERRED EMBODIMENTS

Figure 1:
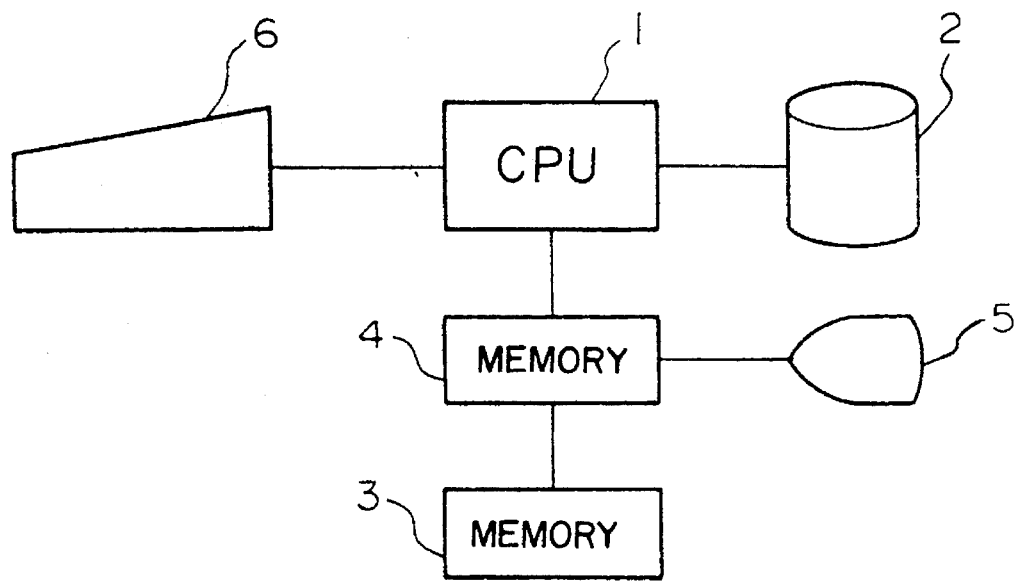
FIG. 1 is a block diagram of a CAD system according to a first embodiment of the present invention.

FIG. 1 is a block diagram of a CAD system according to a first embodiment of the present invention. Prompted by simple operations by the system user, the first embodiment displays the clearance values of the CAD data of a plurality of parts on a CRT display using contour lines.

In FIG. 1, reference numeral 1 is a CPU (central processing unit) that controls various component parts of the system; 2 is a main memory that stores various control programs to be loaded into a memory 3 as well as various data and CAD data for use with these programs; 4 is a memory into which to load the CAD data from the main memory 2; and 5 is a CRT display unit that displays image data corresponding to the CAD data. Reference numeral 6 is a keyboard that the operation or system user utilizes in performing plotting and drawing of figures as well as inputting values.

Figure 2:
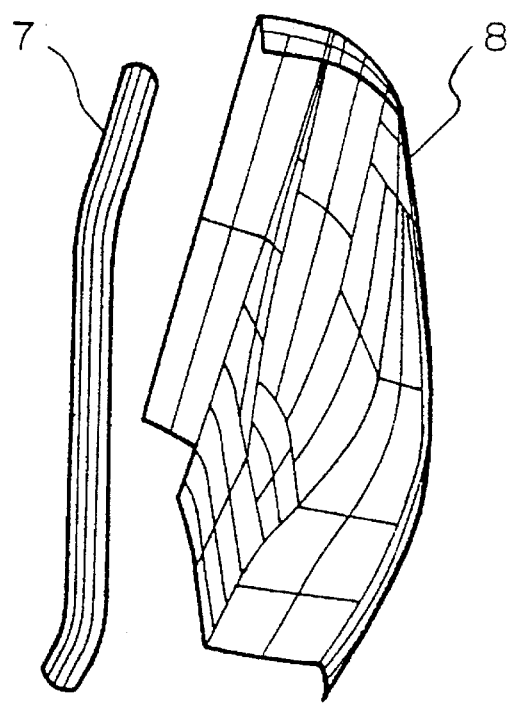
FIG. 2 is a view showing typical CAD data representation connection with the present invention.
Figure 3:
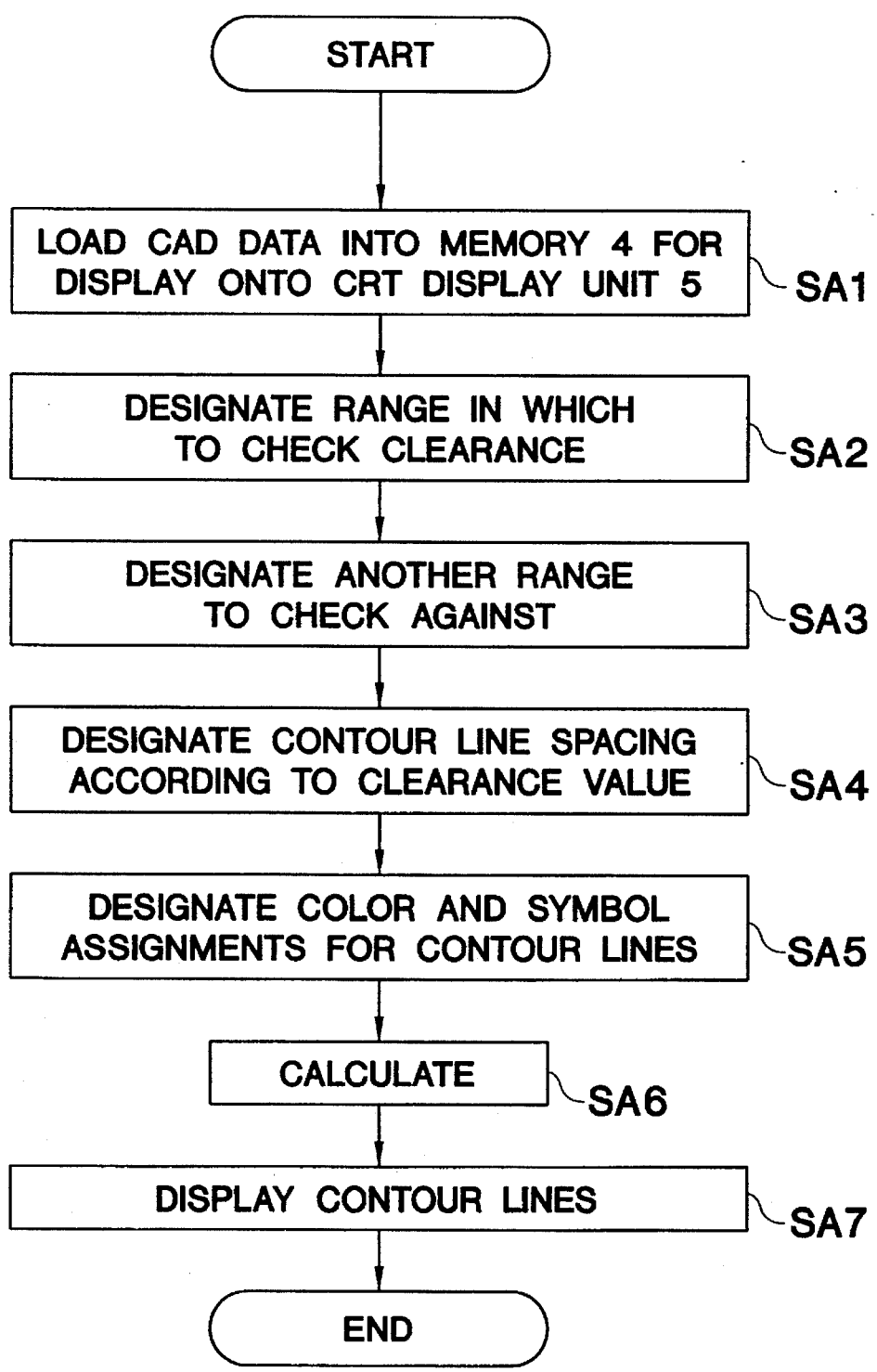
FIG. 3 is a flowchart of operation steps of the CPU and a system user to display clearance values in the CAD data representations of FIG. 1 using contour lines.

In the above setup, the CPU 1 operates in accordance with manipulation of the keyboard by the operator as shown in the flowchart of FIG. 3. The CPU 1 displays clearance values of CAD data using contour lines as illustrated in FIG. 2. In FIG. 2, reference numeral 7 is a representation of CAD data of a motorcycle frame and numeral 8 is a representation of CAD data of a motorcycle cover.

When the CAD system is first powered up, the CPU 1 reads an initial control program from the main memory 2 and loads the program into the memory 3 for system initialization. The operator then operates the keyboard 6 to instruct the start of a CAD data contour line display program. In response, the CPU 1 reads the CAD data contour line display program from the main memory 2 and loads it into the memory 3 for start-up.

Next, the operator operates the keyboard 6 to instruct the retrieval of the CAD data of the entire motorcycle including the CAD data 7 of the frame and the CAD data 8 of the cover as illustrated in FIG. 2. In response, the CPU 1 reads from the main memory 2 the CAD data 7 and 8 and the CAD data of the other motorcycle parts. In step SA1, the CPU 1 loads the retrieved CAD data into the memory 4 and displays on the CRT display unit 5 the image data corresponding to the CAD data.

In step SA2, the operator operates the keyboard 6 to designate a range A of the CAD data of the entire motorcycle. This is the target range of the CAD data for which the clearance is checked. In step SA3, the operator designates another range B of the CAD data. It is relative to the range B that the target range A is checked for clearance. In this example, it is assumed that the operator designates the CAD data 8 as the range A and the CAD data 7 as the range B for clearance check.

In step SA4, the operator operates the keyboard 6 to designate the spacing between contour lines in accordance with the clearance value. In step SA5, the operator designates color, symbol and marking assignments for the contour lines. In this example, the operator sets the contour line spacing to 10 mm and designates the color of red between −10 mm and 0 mm contour lines, yellow between 0 mm and 10 mm contour lines, and blue between 10 mm and 20 mm contour lines. Illustratively, a clearance value of −10 mm means that the CAD data of the two parts in question interfere with one another.

In step SA6, the CPU 1 performs calculations of the contour lines. The calculations are performed on the CAD data regarding a surface model, a trimmed surface model and a solid model. As shown in FIG. 4, the calculations initially involve generating points at equal intervals on the surfaces of the designated ranges A and B, each range being regarded as a set of points. The distances between the points in the ranges A and B are then computed on a round robin basis. If any portions of the ranges A and B interfere with one another, the lines of intersection associated with the interference are also computed. The latter computation will be described later in more detail.

The manner in which points of CAD data are generated in each model will now be described.

(1) Surface model

As depicted in FIG. 5, points P1, . . . and P2, . . . are first generated at equal intervals along ridge lines a(>c) and d (>b). Then an intersection point is calculated between a component line d' passing through the point P1 of the ridge line a on the one hand, and a component line a' passing through the point P2 of the ridge line d on the other hand. The calculations for finding an intersection point between component lines are performed repeatedly to generate points at equal intervals over the surface model.

(2) Trimmed surface model and solid model

In the cases of a trimmed surface model in FIG. 6(a) and of a solid model in FIG. 6(b), a rectangular frame 11 surrounding target surfaces 9 and 10 is generated first. Then points 13, 13, etc. are calculated as points of intersection between lattice lines 12, 12, etc, as shown in FIGS. 6(c) and 6(d) for the trimmed surface model of FIG. 6(a), for example.

Described below is a method for calculating lines of intersection constituting an interfering portion between the ranges A and B. This method is known as the intersection line tracing method that allows interfering lines to be obtained by tracing from interfering points. Specifically, the starting point for tracing of interfering lines is first obtained by calculating where a surface and a point interfere with each other or where two given points interfere with each other on the same surface. The starting point thus obtained is stored in a table (called an edge point table) in the main memory 2 or like storage means. The stored points are later dealt with by the intersection line tracing method. These points are at once candidate starting points and candidate end points. The edge point table when employed allows interfering lines between trimmed surface models to be readily obtained.

Figure 7:
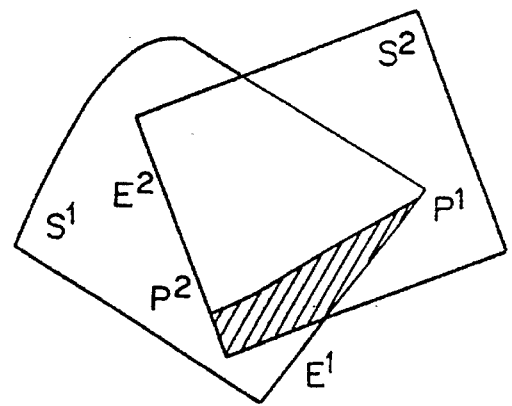
FIGS. 7(a)–7(c) are a set of views describing how the intersection line tracing method is effected in connection the invention.
Figure 7:
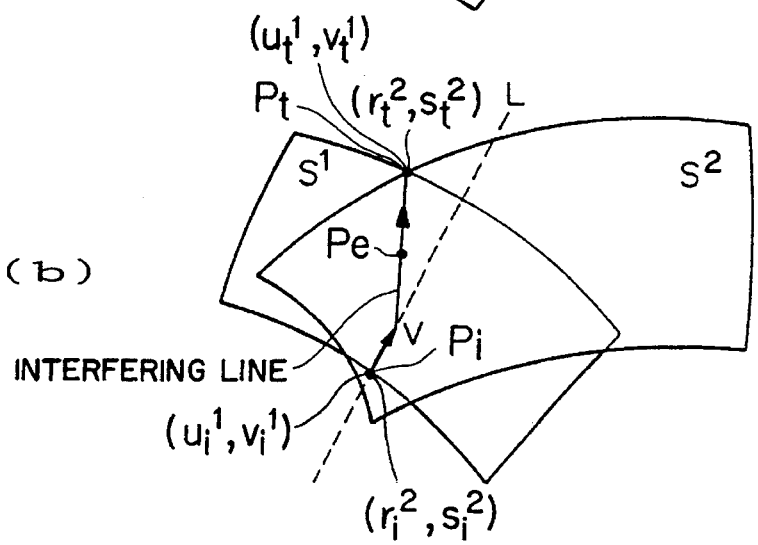
Figure 7:
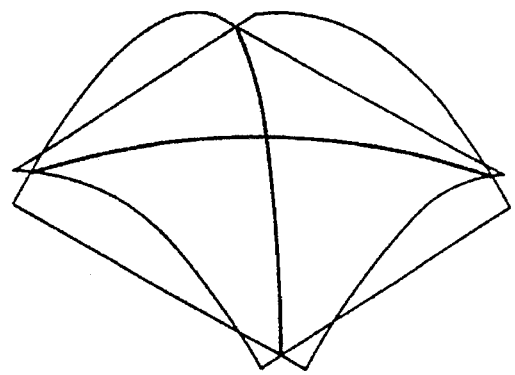

The procedure for calculating the interfering lines between parametric surfaces $S^1$ and $S^2$ in FIG. 7(a) comprises the following 10 stages:

Stage 1: A rough check is made to see if any interference is probable between the two surfaces. If there is no possibility of interference between the surfaces, the processing is terminated.

Stage 2: An interfering point $P^1$ is obtained between each boundary curve $E^1$ on the parametric surface $S^1$ and the parametric surface $S^2$. The interfering points thus obtained are stored in the edge point table.

(a) Surface-to-line interference calculations are performed to find the interfering point $P^1$ between each boundary curve $E^1$ of the parametric surface $S^1$ and the parametric surface $S^2$ as well as to find the parameter value of the interfering point $P^1$ on the parametric surface $S^2$.

(b) The parameter value of the interfering point $P^1$ on the parametric surface $S^1$ is obtained.

(c) It may happen that the ridge lines generated as a result of the calculations of interference between parametric surface $S^1$ and the parametric surface $S^2$ are not located precisely on the parametric surface $S^1$ or $S^2$. Such ridge lines are hereinafter called trimming ridge lines. If any boundary curve $E^1$ of the parametric surface $S^1$ is a trimming ridge line, then a precise interfering point is to be obtained between the two parametric surfaces $S^1$ and $S^2$ providing the basis for generating that particular boundary curve $E^1$ on the one hand, and the parametric surface $S^2$ on the other hand. If the boundary curve $E^1$ of the parametric surface $S^1$ is not a trimming ridge line, the interfering point obtained in (a) above is employed.

(d) The parameter values of each interfering point on the parametric surfaces $S^1$ and $S^2$ are stored into the edge point table.

Stage 3: An interfering point $P^2$ is obtained between each boundary curve $E^2$ of the parametric surface $S^2$ and the parametric surface $S^1$. The obtained interfering point is stored into the edge point table.

(a) Surface-to-line interference calculations are performed to find the interfering point $P^2$ between each boundary cue $E^2$ of the parametric surface $S^2$ and the parametric surface $S^1$ as well as to find the parameter value of the interfering point on the parametric surface $S^1$.

(b) The parameter value of the interfering point $P^2$ on the parametric surface $S^2$ is obtained.

(c) If any boundary curve $E^2$ of the parametric surface $S^2$ is a trimming ridge line, then a precise interfering point is to be obtained between the two parametric surfaces $S^1$ and $S^2$ providing the basis for generating that particular boundary curve $E^2$ on the one hand, and the parametric surface $S^1$ on the other hand. If the boundary curve $E^2$ of the parametric surface $S^2$ is not a trimming ridge line, the interfering point obtained in (a) above is employed.

(d) The parameter values of each interfering point on the parametric surfaces $S^1$ and $S^2$ are stored into the edge point table.

Stage 4: If the edge point table is empty at this point, it is possible that interfering lines may be generated within the parametric surfaces $S^1$ and $S^2$. If any interfering line exists within the parametric surface $S^1$ or $S^2$, one point on that interfering line is obtained as an interfering point, and the interfering point thus acquired is stored into the edge point table.

Stage 5: If the edge point table is empty at this point, the processing is terminated.

Stage 6: The direction of tracing from each edge point stored in the edge point table is determined. First, the edge point table is scanned and the direction of a tracing vector V from each edge point is determined accordingly. As shown in FIG. 7(b), it is assumed that the parameter values of an edge point $P_i$ on the parametric surface $S^1$, the point being stored in the edge point table, are represented by $(u_i^1, v_i^1)$ and that the parameter values of the same point on the parametric surface $S^2$ are denoted by $(r_i^2, s_i^2)$. A straight line L is the line of intersection between the tangent plane of the parametric surface $S^1$ $(u_i^1, v_i^1)$ and that of the parametric surface $S^2$ $(r_i^2, s_i^2)$. In this setup, as illustrated in FIG. 7(b), the straight line L is in the same direction as that of the vector V of the interfering line on the two parametric surfaces $S^1$ and $S^2$ at the edge point $P_i$ that is stored in the edge point table.

Stage 7: Untraced points are now obtained from the edge point table. Retrieved from the edge point table are the parameter values $(u_i^1, v_i^1)$ of the untraced edge point $P_i$ (i=index value in the edge point table) located on the parametric surface $S^1$ and to which a tracing vector is set, as well as the parameter values $(r_i^2, s_i^2)$ of the same point on the parametric surface $S^2$. The tracing vector V is also retrieved from the edge point table.

Stage 8: Points and their vectors are obtained on the interfering lines throughout the stages of tracing. Tracing is pursued until one of the following two tracing terminating conditions (1) and (2) is met:

(1) An edge point $P_e$ of the tracing vector is compared with a coordinate value $P_t$ stored in the edge point table. If the distance between the two points is shorter than the length of the tracing vector and if a vector is set to the coordinate value $P_t$, that means the tracing vector and the vector set to the coordinate value $P_t$ are oriented in the same direction.

(2) The tip of the tracing vector is located beyond the parameter space of the two parametric surfaces $S^1$ and $S^2$. Tracing is carried out by first extending the tracing vector from the edge point $P_1$ in the edge point table over an appropriate distance in the direction of the vector V. Then the so-called Newton-Raphson method is used geometrically to obtain the point traced from the edge point of the tracing vector onto the two parametric surfaces $S^1$ and $S^2$. That point is again used as the starting point from which to perform further tracing. The process is repeated until one of the two tracing terminating conditions above is met. In this way, a row of points along the interfering line between the parametric surfaces $S^1$ and $S^2$ is acquired. The length of the tracing vector discussed above is preferably made shorter where the normal vector of the parametric surface $S^1$ is closer in direction to that of the parametric surface $S^2$, and where the direction of the tracing vector changes more significantly.

Stage 9: A curve sequence is generated using those points and their vectors on the interfering lines which are obtained in stage 8 above.

Stage 10: If a plurality of curve sequences are obtained in stage 9, interfering points between these curve sequences are acquired. With such interfering points obtained, each interfering line is divided at a given interfering point, as depicted in FIG. 7(c).

Figure 8:
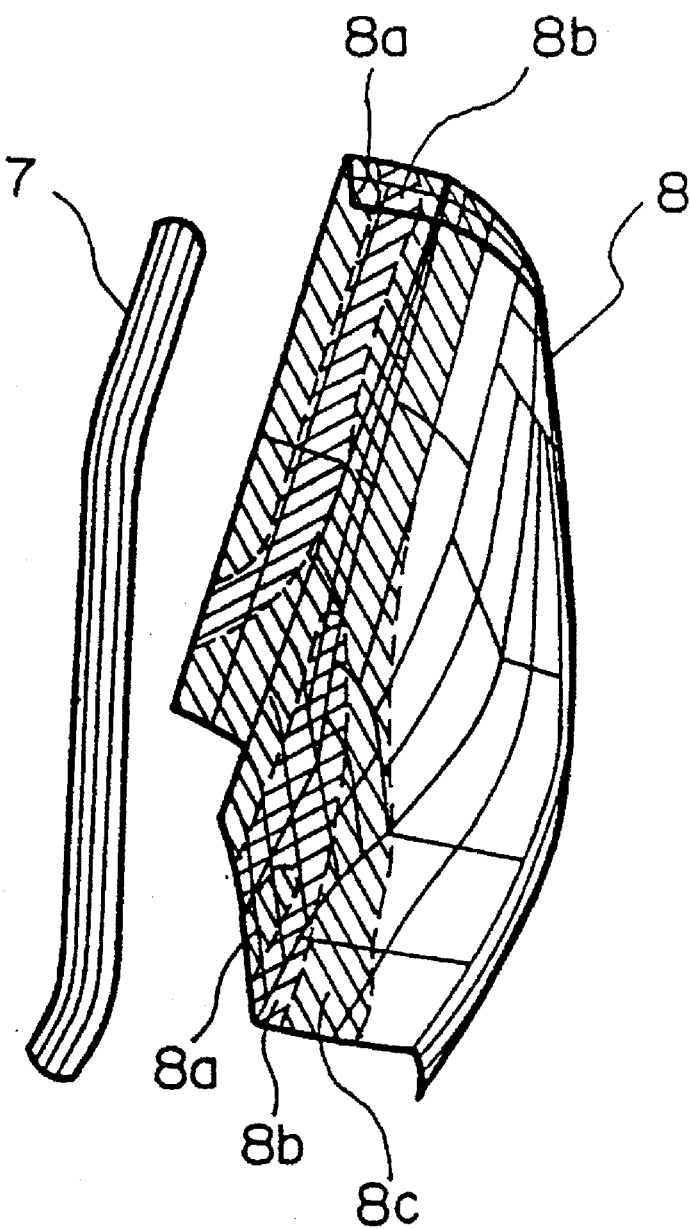
FIG. 8 is a view indicating typical contour lines and contour line spacings for the CAD data representative in FIG. 2.

The CPU 1 then leaves step SA6 and enters step SA7. In step SA7, the CPU 1 displays on the CRT display unit 5 the contour lines and spacings therebetween of the clearance values regarding the CAD data 8 obtained by the calculations in step SA6 above, as illustrated in FIG. 8. The processing of the CPU 1 then comes to an end. In FIG. 8, a spacing 8a between −10 mm and 0 mm contour lines is displayed in red on the CRT display unit 5. Similarly, a spacing 8b between 0 mm and 10 mm contour lines is displayed in yellow and a clearance 8c between 10 mm and 20 mm contour lines is displayed in blue on the CRT display unit 5.

As described, the first embodiment allows actual clearance values of the CAD data on various parts to be displayed on the CRT display unit 5 when the operator performs simple operations on the keyboard 6. This significantly boosts the efficiency of the work to realize clearance values in a visually comprehensible manner. Although the first embodiment utilizes the keyboard 6 as its operation means, the invention is not limited thereby. Alternatively, a mouse, a tablet or other devices may be used to replace the keyboard 6.

Figure 9:
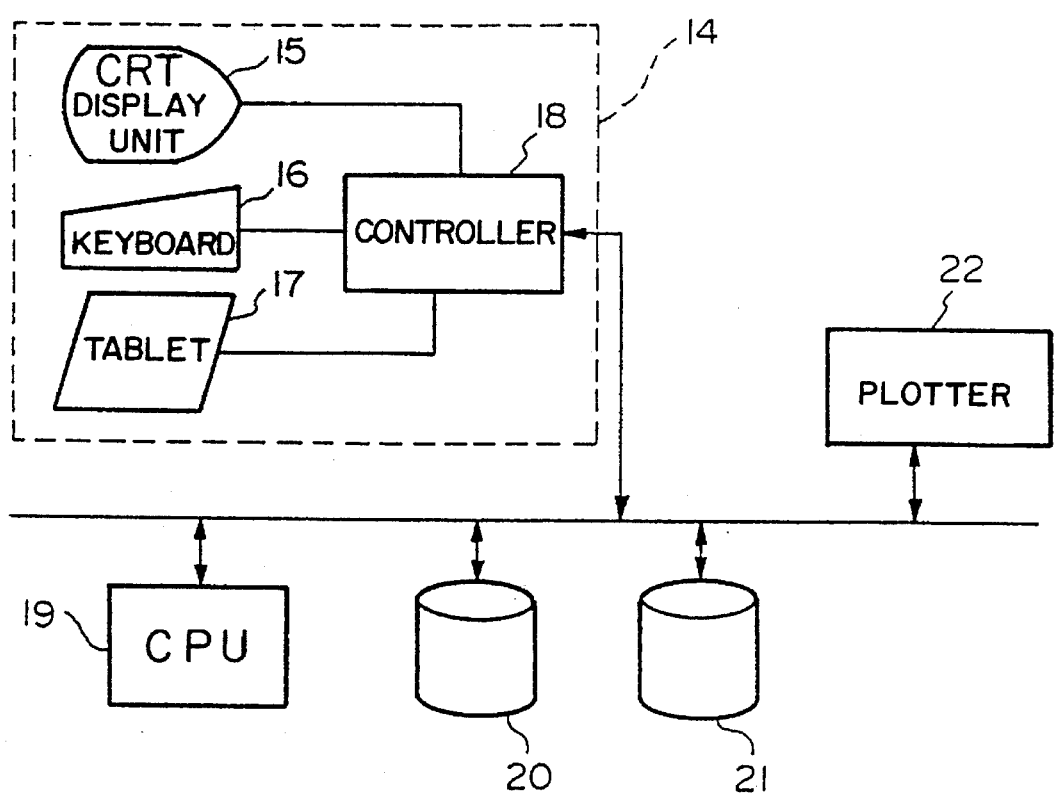
FIG. 9 is a block diagram of a CAD system according to a second embodiment the present invention.

FIG. 9 is a block diagram of a CAD system according to a second embodiment of the invention. This embodiment is designed to optimize the clearance values of the CAD data on various parts in response to simple operations carried out by the operator. In FIG. 9, reference number 14 is a console that allows the operator to plot or draw figures and to do other editing work. The console 14 includes a CRT display unit 15, a keyboard 16 and a tablet 17. A controller 18 provides display control over the CRT display unit 15 and key scan control over the keyboard 16. From the keyboard 16, various commands and numeric values are input; from the tablet 17, position data indicating the cursor position are input. These input commands and data are supplied to a CPU 19 via the controller 18. The CPU 19, operated by various control programs in a program memory 20, controls the component parts of the system. The CPU 19 transfers various image data to the controller 18. In turn, the controller 18 causes the transferred image data to be displayed on the CRT display unit 15. Reference number 21 is a data file that contains CAD data and other resources, a numeral 22 is a plotter by which to plot CAD data.

Figure 10:
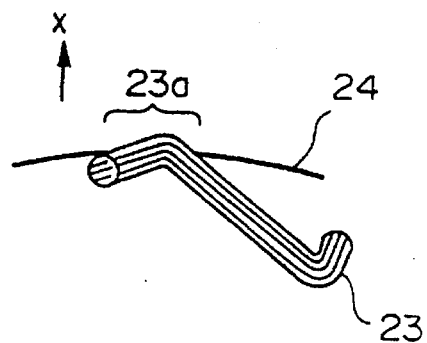
FIGS. 10(a)–10(c) are a set of views illustrating typical CAD data representations in connection with the present invention.
Figure 10:
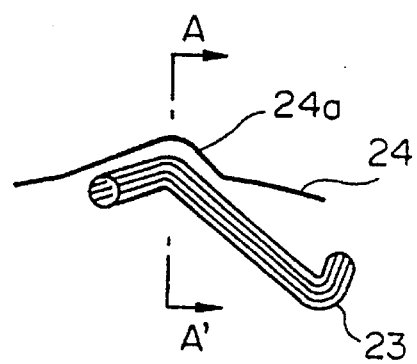
Figure 10:
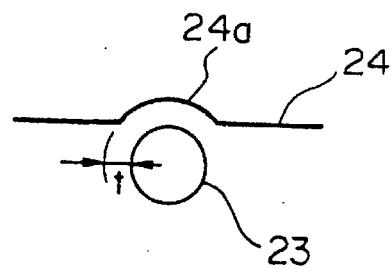
Figure 11:
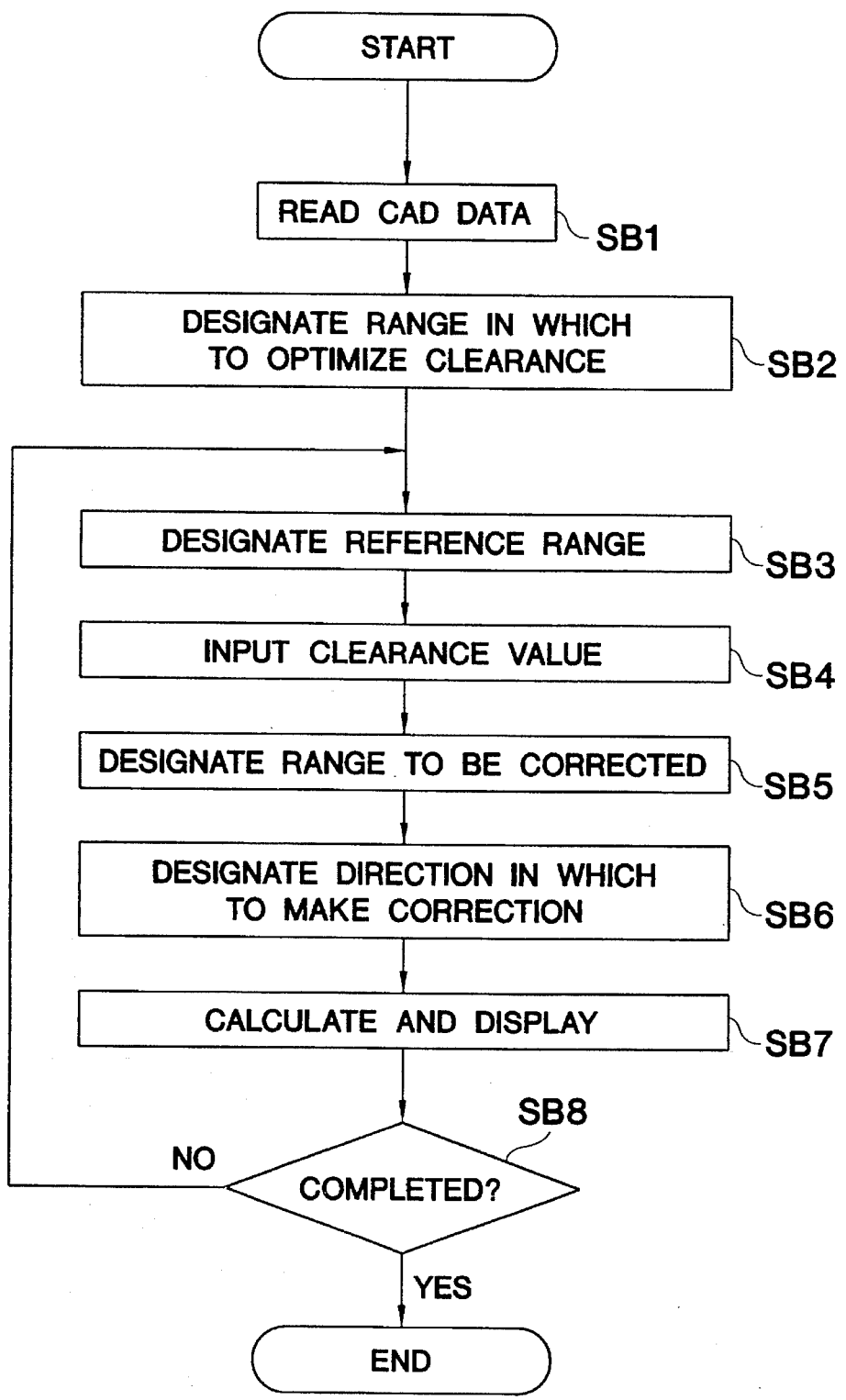
FIG. 11 is a flowchart of operation steps of the CPU and a system user to optimize the clearance value for the CAD data representations in FIG. 10.

In the above setup, the CPU 19 operates in accordance with manipulation of the keyboard by the operator as shown in the flowchart of FIG. 11. The CPU 19 optimizes clearance values of CAD data of two parts, as illustrated in FIG. 10(a). In FIG. 10(a), reference numeral 23 is a representation of CAD data of a motorcycle frame; 24 is a representation of CAD data of a motorcycle cover; and 23a is an interfering portion between the CAD data 23 and the CAD data 24.

When the CAD system is first powered up, the CPU 19 reads an initial control program from the program memory 20 for system initialization. The operator then operates the keyboard 16 to instruct the start of a CAD data clearance value optimizing program. In response, the CPU 19 reads the CAD data clearance value optimizing program from the program memory 20 for start-up.

Next, the operator operates the keyboard 16 to instruct the retrieval of the CAD data of the entire motorcycle including the CAD data 23 of the frame and the CAD data 24 of the cover in FIG. 10(a). In response, the CPU 19 enters step SB1 and reads from the data file 21 the CAD data 23 and 24 and the CAD data of the other motorcycle parts.

In step SB2, the operator operates the keyboard 16 to designate a target range of the CAD data of the entire motorcycle. This is the range in which clearance values are to be optimized. In response, the CPU 19 transfers to the controller 18 the image data corresponding to the designated CAD data. The controller 18 displays the transferred image data on the CRT display unit 15.

In step SB3, the operator operates the keyboard 16 to designate a reference range for the CAD data designated in step SB2. In this example, it is assumed that the operator designates the CAD data 23 and 24 (in FIG. 10(a)) as the target range in which to optimize the clearance values and that the operator designates the CAD data 23 as the reference range.

In step SB4, the operator operates the keyboard 16 to input desired clearance values. In step SB5, the operator designates the target range to be corrected. In step SB6, the operator designates the direction in which to carry out the correction. In this example, it is assumed that the operator sets the clearance value to t mm, designates the CAD data 24 as the target range to be corrected, and specifies the direction x (in FIG. 10(a)) as the direction in which to perform the correction.

Figure 12:
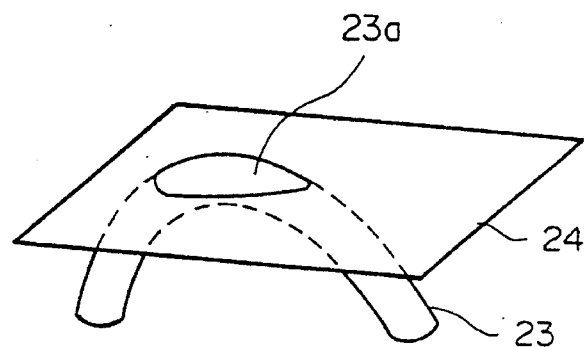
FIGS. 12(a)–12(c) are a set of views describing how the clearance value optimizing calculations of step SB7 in FIG. 11 are formed.
Figure 12:
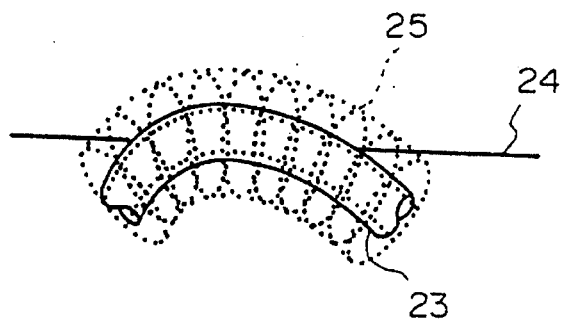
Figure 12:
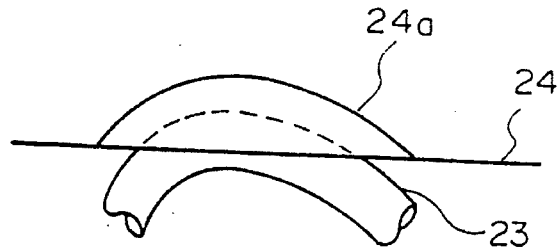

Then in step SB7, the CPU 19 performs calculations for clearance value optimization using the data designated or input by the operator in steps SB3 through SB6. The calculations address the CAD data regarding a surface model, a trimmed surface model and a solid model, and are carried out as follows:

The CPU 19 first generates a group of points 25 set apart by the clearance value input in step SB4 (by t mm in this example, as shown in FIG. 12(b)). The points are generated within the reference range of CAD data designated in step SB3 (CAD data 23 in this example, indicated in FIG. 12(a)). After generating a plane based on the point group 25, the CPU 19 leaves intact that portion of the plane which is oriented in the direction designated in step SB6. In this example, a corrective portion 24a is left intact (see FIG. 12(c)) and the interfering portion 23a of the CAD data 23 is cut off automatically.

The CPU 19 then transfers to the controller 18 the image data corresponding to the CAD data corrected as a result of the above calculations. Still in step SB7, the controller 18 causes the transferred image data to be displayed on the CRT display unit 15. FIG. 10(b) is a view of the corrected CAD data 23 and 24 as they are displayed on the display screen, and FIG. 10(c) is a cross-sectional view taken on line A—A' in FIG. 10(b). In these figures, reference numeral 24a points to the corrective portion of the CAD data, and reference character t indicates that the clearance between the CAD data 23 and 24 is corrected to the predetermined value of t.

Figure 13:
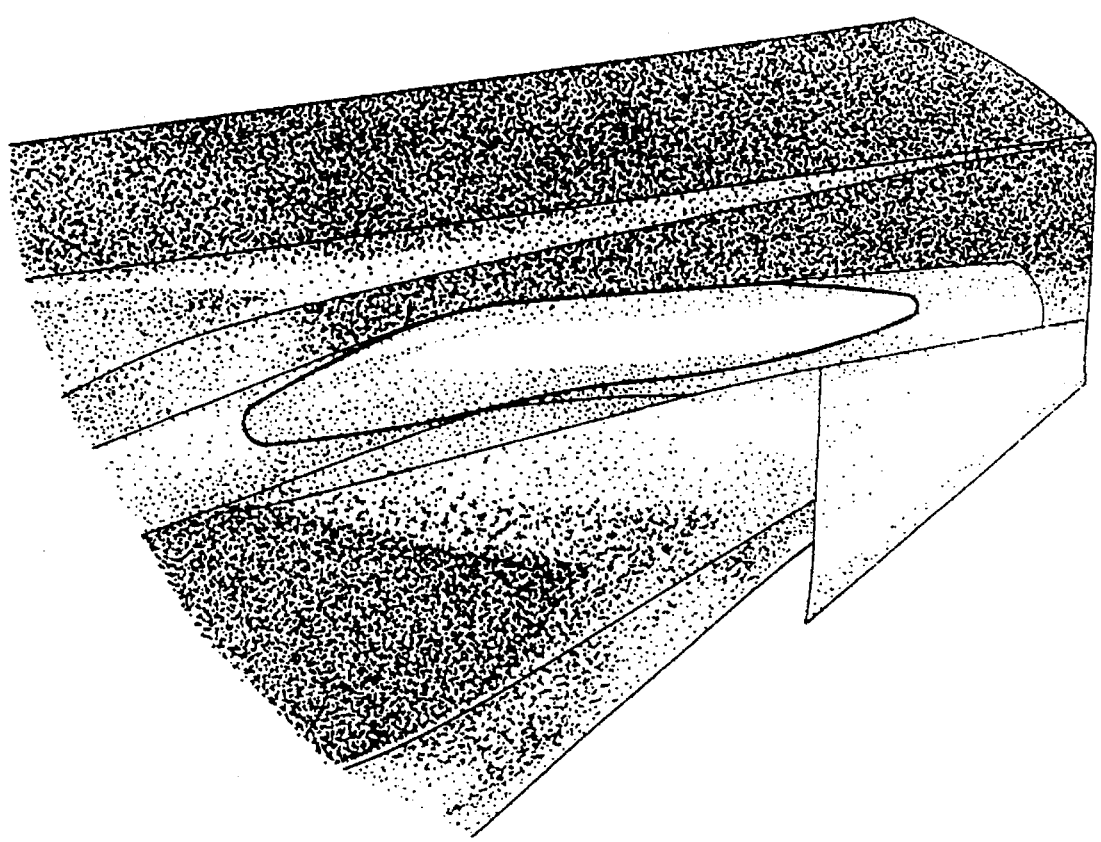
FIG. 13 is a view depicting a typical CAD data representation in connection with the present invention.
Figure 14:
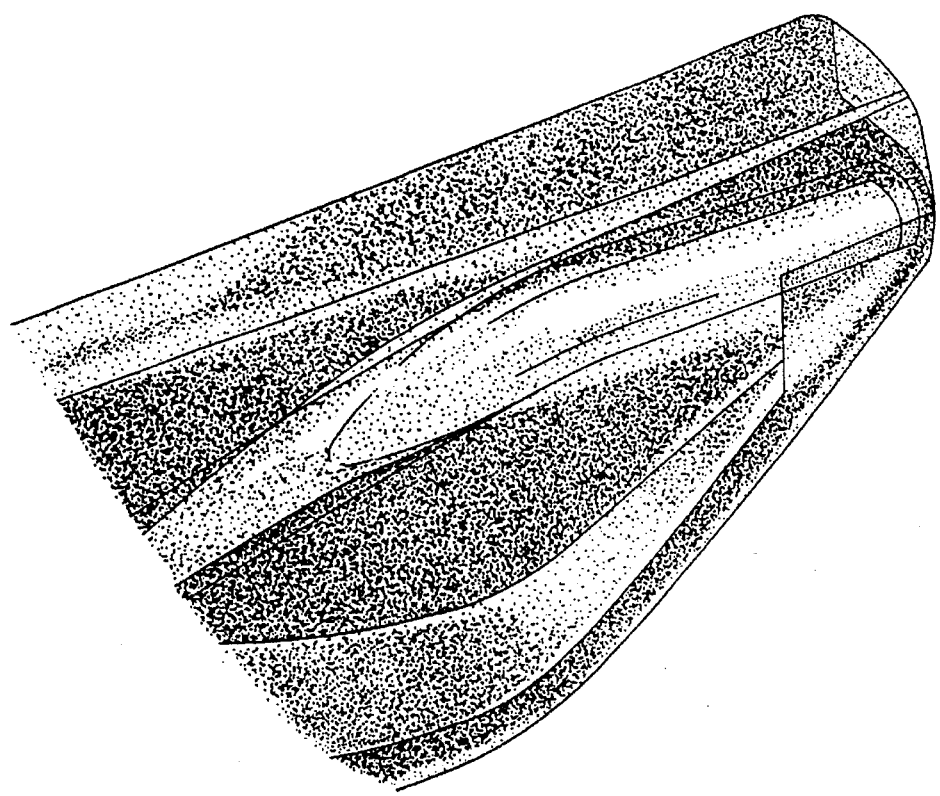
FIG. 14 is a view showing how the CAD data representation of FIG. 13 has its clearance value optimized according to the present invention.

In step SB4, the operator checks to see if the CAD data displayed on the CRT display unit 15 in step SB7 is satisfactory. If the CAD data is satisfactory, the operator brings the processing to an end; if the CAD data is not satisfactory, process flow returns to step SB3 and steps SB3 through SB7 are repeated. The ultimately corrected CAD data is stored into the data file while step SB8 is still in effect. FIGS. 13 and 14 are views of typical CAD data representations before and after correction, respectively.

As described, the second embodiment of the present invention provides a CAD system which, given two interfering parts on display, corrects automatically the clearance between the CAD data on these parts to an optimum predetermined value without altering the respective positions of the parts. The system requires only minimum intervention by the operator in carrying out its task. This makes it possible to eliminate all interference between the component parts of the product in question while drastically reducing the number of corrective steps and minimizing the possibility of operator mistakes at the same time. Furthermore, the second embodiment is capable of correcting the CAD data regarding any one of the surface model, trimmed surface model or solid model. In that sense, there is no need for the operator to change the operating procedure involving the keyboard 16 in terms of different models. This results in a high degree of system operability and reduced operating processes.

Figure 15:
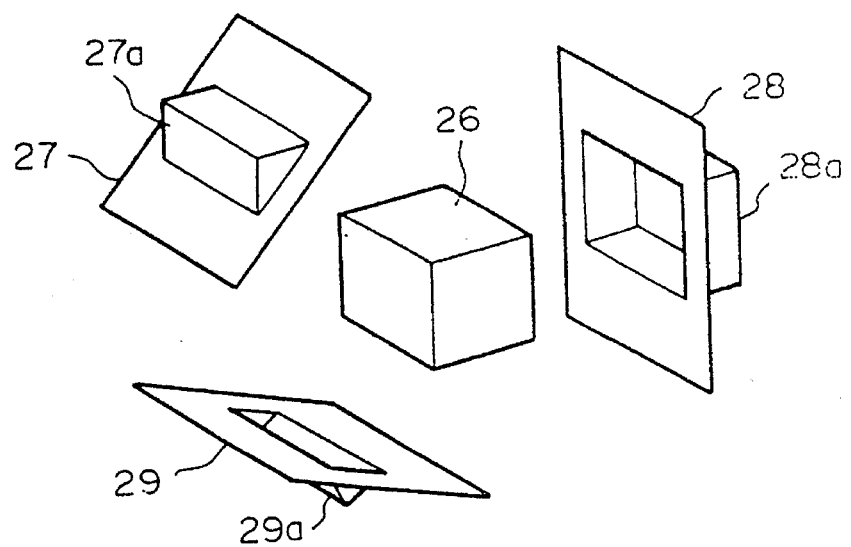
FIG. 15 is a view describing how a variation of the second embodiment provides clearance value optimization.

In the example discussed above in connection with the second embodiment, two parts interfere with each other wherein the CAD data of one of the parts is corrected for interference. Alternatively, as illustrated in FIG. 15, more than two parts may interfere with one another, and the CAD data of these parts may be corrected concurrently for interference. In FIG. 15, reference numerals 26 through 29 are CAD data representations, and 27a through 29a are corrective portions of the CAD data representations 27 through 29.

As described, the CAD system according to the first embodiment of the present invention allows the operator to recognize the actual clearance between parts by simple operations. The CAD system according to the second embodiment of the present invention allows the operator to optimize the clearance value also by simple operations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-aided design system comprising:

storage means for storing computer-aided design data of a plurality of parts of an object;

display means, coupled to said storage means, for displaying image data corresponding to said computer-aided design data;

operation means for performing plotting and drawing of said plurality of parts of said object in accordance with values input to said operation mean by a system user; and control means, operatively coupled to said storage means, said display means and said operation means, for reading from said storage means said computer-aided design data of said plurality of parts of said object, combining image data corresponding to said computer-aided design data, displaying said combined image data on said display means, calculating clearances between said plurality of parts of said combined image data displayed on said display means in accordance with said input values, and displaying said clearances on said combined image data as contour lines.

2. The computer-aided design system of claim 1, wherein said contour lines displayed on said combined image data are indicative of whether said plurality of parts of said object abut with one another and are indicative of spacings of said clearances between said plurality of parts.

3. The computer-aided design system of claim 2, wherein said contour lines are displayed as a first color indicative that said plurality of parts of said object abut one another, a second color indicative of a clearance spacing within a first predetermined range and a third color indicative of a clearance spacing within a second predetermined range.

4. The computer-aided design system of claim 3, wherein said first and second predetermined ranges and said first, second and third colors are input by the system user via said operation means as said input values.

5. The computer-aided design system of claim 1, wherein said operation means comprises a keyboard.

6. The computer-aided design system of claim 1, wherein said operation means comprises a mouse.

7. The computer-aided design system of claim 1, wherein said operation means comprises a tablet.

8. A method of computer-aided design comprising the steps of:

storing computer-aided design data of a plurality of parts of an object;

reading the stored computer-aided design data of the plurality of parts of the object as selected by a system user;

combining image data corresponding to the read computer-aided design data of the plurality of parts of the object selected by the system user;

displaying the combined image data as a combined image;

determining clearances between the plurality of parts of the object of the displayed combined image; and displaying the determined clearances on the displayed combined image as contour lines.

9. The method of computer-aided design of claim 8, wherein the contour lines indicate spacings between the calculated clearances and whether the plurality of parts of the object selected by the system user abut one another.

10. The method of computer-aided design of claim 9, wherein the contour lines are displayed as a first color indicative that the plurality of parts of the object selected by the system user abut one another, a second color indicative of a clearance spacing within a first predetermined range and a third color indicative of a clearance spacing within a second predetermined range.

11. The method of computer-aided design of claim 10, wherein the first and second ranges and the first, second and third colors are selected by the system user.

* * * * *